(12) United States Patent
Gonzalez et al.

(10) Patent No.: US 10,785,909 B2
(45) Date of Patent: Sep. 29, 2020

(54) DOUBLE MECHANISM SUSPENDED TONGUE FOR TOWED IMPLEMENTS

(71) Applicant: Deere & Company, Moline, IL (US)

(72) Inventors: Ivan Alejandro Gonzalez, Monterrey (MX); Hector Gerald Martinez, Guadalupe (MX); Jose Alberto Hernandez, San Nicolás de los Garza (MX); Adrian Antonio Aquino, Monterrey (MX)

(73) Assignee: Deere & Company, Moline, IL (US)

(*) Notice: Subject to any disclaimer, the term of this patent is extended or adjusted under 35 U.S.C. 154(b) by 168 days.

(21) Appl. No.: 15/969,382

(22) Filed: May 2, 2018

(65) Prior Publication Data

US 2019/0335657 A1 Nov. 7, 2019

(51) Int. Cl.
| | |
|---|---|
| *A01D 34/82* | (2006.01) |
| *A01B 59/00* | (2006.01) |
| *A01B 59/042* | (2006.01) |
| *A01D 34/64* | (2006.01) |
| *A01D 34/74* | (2006.01) |

(52) U.S. Cl.
CPC ............ *A01D 34/82* (2013.01); *A01B 59/002* (2013.01); *A01B 59/042* (2013.01); *A01D 34/64* (2013.01); *A01D 34/74* (2013.01)

(58) Field of Classification Search
CPC ... A01B 59/042; A01B 59/002; A01B 59/043; B60D 2001/008; B60D 1/465; B60D 1/50; A01D 34/82; A01D 34/74; A01D 34/64; A01D 34/661; A01D 67/005
See application file for complete search history.

(56) References Cited

U.S. PATENT DOCUMENTS

| | | | | |
|---|---|---|---|---|
| 2,238,095 A | * | 4/1941 | Almcrantz | B60D 1/34 280/446.1 |
| 2,458,666 A | * | 1/1949 | Williams | B60D 1/07 280/405.1 |
| 4,408,777 A | | 10/1983 | Carrick | |
| 4,792,154 A | * | 12/1988 | Kerst | B60D 1/50 280/489 |

(Continued)

FOREIGN PATENT DOCUMENTS

| | | |
|---|---|---|
| DE | 9101500 U1 | 5/1991 |
| EP | 0465790 A1 | 1/1992 |
| GB | 2329368 A | 3/1999 |

OTHER PUBLICATIONS

European Search Report issued in counterpart application No. 19165896.2, dated Sep. 16, 2019, 10 pages.

*Primary Examiner* — Arpad Fabian-Kovacs
(74) *Attorney, Agent, or Firm* — Tucker Ellis LLP

(57) ABSTRACT

A shock-absorbing tongue assembly for coupling a rotary cutter with a work vehicle includes a coupler configured to couple to the work vehicle, and a linkage mechanism having a proximal end at the rotary cutter and a distal end at the coupler. The linkage mechanism includes a suspension element configured to dampen energy transferred between the rotary cutter and the work vehicle, a primary linkage mechanism extending from the rotary cutter, and a secondary linkage mechanism extending between the primary linkage mechanism and the coupler. The secondary linkage mechanism is configured to rotate about the primary linkage mechanism while maintaining the coupler in a level condition.

20 Claims, 10 Drawing Sheets

(56) References Cited

U.S. PATENT DOCUMENTS

| | | | |
|---|---|---|---|
| 5,386,680 A * | 2/1995 | Friesen | A01B 59/042 403/157 |
| 5,918,451 A * | 7/1999 | Vonesch | A01D 78/1007 56/365 |
| 6,430,908 B1 * | 8/2002 | Friesen | A01B 59/042 172/677 |
| 6,581,951 B2 * | 6/2003 | Lange | B62D 53/0807 280/440 |
| 6,718,747 B2 | 4/2004 | Friesen | |
| 7,021,396 B2 * | 4/2006 | Steinberger | A01B 59/06 172/439 |
| 9,505,281 B1 * | 11/2016 | Borkholder | B60D 1/248 |
| 10,045,473 B2 * | 8/2018 | Garcia | B60D 1/50 |
| 2003/0178811 A1 | 9/2003 | Buckner | |
| 2017/0332542 A1 | 11/2017 | Garcia | |

* cited by examiner

DOUBLE MECHANISM SUSPENDED TONGUE FOR TOWED IMPLEMENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to towing implements with work vehicles, and more specifically to tongue assemblies for towed implements.

BACKGROUND OF THE DISCLOSURE

In the agriculture, construction, and forestry industries, as well as other industries, work vehicles may utilize implements to perform particular tasks, such as for cutting, harvesting, tilling, and shredding, as the implement is towed behind the work vehicle. Such implements are coupled behind the work vehicle with a tongue assembly. As an example, during a cutting operation a tractor may tow a rotary cutter that is hitched to the tractor by a tongue assembly.

SUMMARY OF THE DISCLOSURE

The disclosure provides a tongue assembly for coupling a towed implement to a work vehicle.

In one aspect, the disclosure provides a shock-absorbing tongue assembly for coupling a rotary cutter with a work vehicle. The assembly includes a coupler configured to couple to the work vehicle, and a linkage mechanism having a proximal end at the rotary cutter and a distal end at the coupler. The linkage mechanism includes a suspension element configured to dampen energy transferred between the rotary cutter and the work vehicle. A primary linkage mechanism extends from the rotary cutter, and a secondary linkage mechanism extends between the primary linkage mechanism and the coupler. The secondary linkage mechanism is configured to rotate about the primary linkage mechanism while maintaining the coupler in a level condition.

In another aspect, the disclosure provides a shock-absorbing tongue assembly for coupling a rotary cutter with a work vehicle. The assembly includes a coupler configured to couple to the work vehicle, and a linkage mechanism having a proximal end at the rotary cutter and a distal end at the coupler. The linkage mechanism includes a suspension element configured to dampen energy transferred between the rotary cutter and the work vehicle. A primary linkage mechanism extends from the rotary cutter and includes a first upper link and a first lower link each extending from the proximal end in a direction away from the rotary cutter. The first upper link is connected with the rotary cutter at an upper connection and the first lower link is connected with the rotary cutter a lower connection. The upper and lower connections are spaced apart on the rotary cutter. A secondary linkage mechanism extends between the primary linkage mechanism and the coupler and includes a second upper link connected with the first upper link, and a second lower link connected with the first lower link.

In a further aspect, a shock-absorbing tongue assembly for coupling a rotary cutter with a work vehicle includes a coupler that couples to the work vehicle and acts as a first vertical link. A mount is provided on the rotary cutter with upper and lower connections configured to connect the assembly with the rotary cutter. A linkage mechanism has a proximal end connected with the rotary cutter at the upper and lower connections and has a distal end connected with the coupler. The linkage also includes a suspension element configured to dampen energy transferred between the rotary cutter and the work vehicle. A primary linkage mechanism includes a first upper link connected with the rotary cutter at the upper connection and a first lower link connected with the rotary cutter at the lower connection. The first upper link and the first lower link are spaced apart by being connected with the mount, with the mount configured as a second vertical link. A secondary linkage mechanism is connected with the primary linkage mechanism and with the coupler. The secondary linkage mechanism includes a second upper link and a second lower link. The linkage mechanism includes a first upper pivot connecting the first and second upper links, a first lower pivot connecting the first and second lower links, and a spacing link connected between the first upper pivot and the first lower pivot. The spacing link is configured as a third vertical link. The coupler is configured to move vertically relative to the mount by operation of the linkage mechanism.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed suspended tongue assembly, as shown in the accompanying figures of the drawings described briefly above. Various modifications to the example embodiments may be contemplated by one of skill in the art.

Generally, the example tongue assembly is used to hitch/couple a work implement to a work vehicle in a work vehicle train, such as for towing the implement behind the work vehicle to perform a task, such as mowing or harvesting. The connection between the towing work vehicle and a towed implement may include a draw pin which extends through a clevis on the implement tongue assembly and an apertured drawbar of the towing vehicle. The effectiveness of the implement to perform its tasks is facilitated by counter movement in the tongue assembly to reduce implement vertical movements or imbalances relative to the towing vehicle and the ground. For example, this may be accomplished when the work vehicle and/or the implement traverses uneven ground.

In one or more example implementations of the disclosed system, the tongue assembly is connected with, or is an integral part of, the implement and includes a coupler to attach the tongue assembly to the work vehicle, such as by hitching. The tongue assembly includes primary and secondary linkage mechanisms arranged in a double four-bar linkage mechanism that allows the coupler, which is hitched to the work vehicle, to move relative to the implement. The linkage mechanism maintains the coupler in a level condition as it moves relative to the implement so that stresses or binds are not introduced. The linkage mechanism also maintains the coupler level when the height of the implement is adjusted.

The following description relates to tongue systems in the context of certain implement applications for purposes of demonstrating examples. In these applications, effective reduction in the transmission of loads between the towing work vehicle and the hitched implement is desired. The present disclosure is not limited to any particular work vehicle applications, or to any particular type of implement, but rather also encompasses any hitching application where a reduction in load transfer is desired. In some embodiments, for example, the implement may be configured as a shredder, scraper, tillage equipment, harvesting or foraging equipment, and other type of agriculture, construction or forestry implement. Likewise, the work vehicle may also be configured as a truck, utility vehicle, or any type of propulsion vehicle. Accordingly, the teachings of the present disclosure may be applied to coupling systems in a variety of applications, including with work vehicle towed rotary cutters, when desired.

Figure 1:
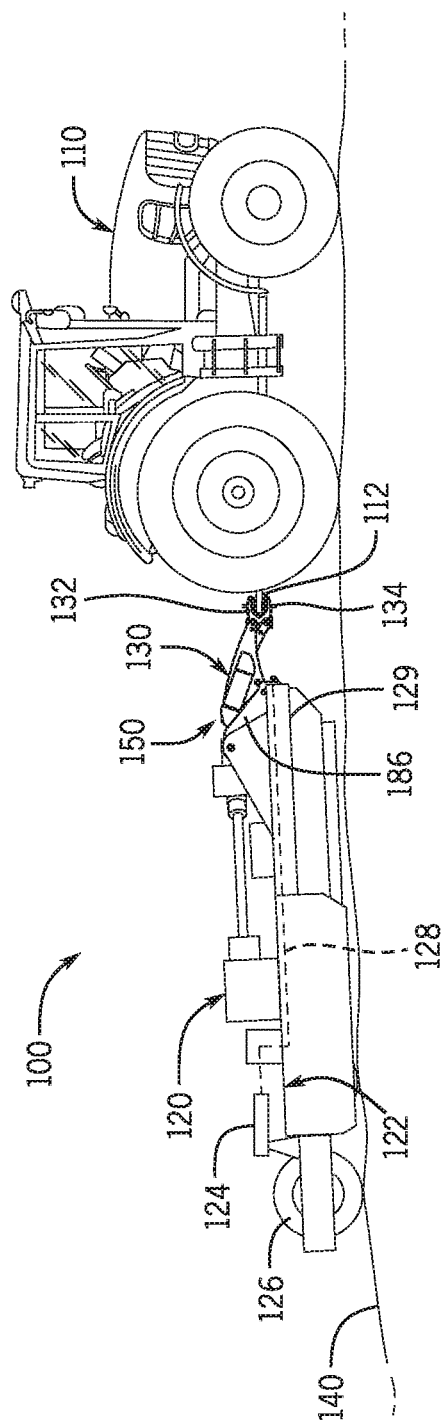
FIG. 1 is a side view of an example work vehicle train in the form of a rotary cutter coupled to a tractor by a tongue assembly in accordance with this disclosure.
Figure 2:
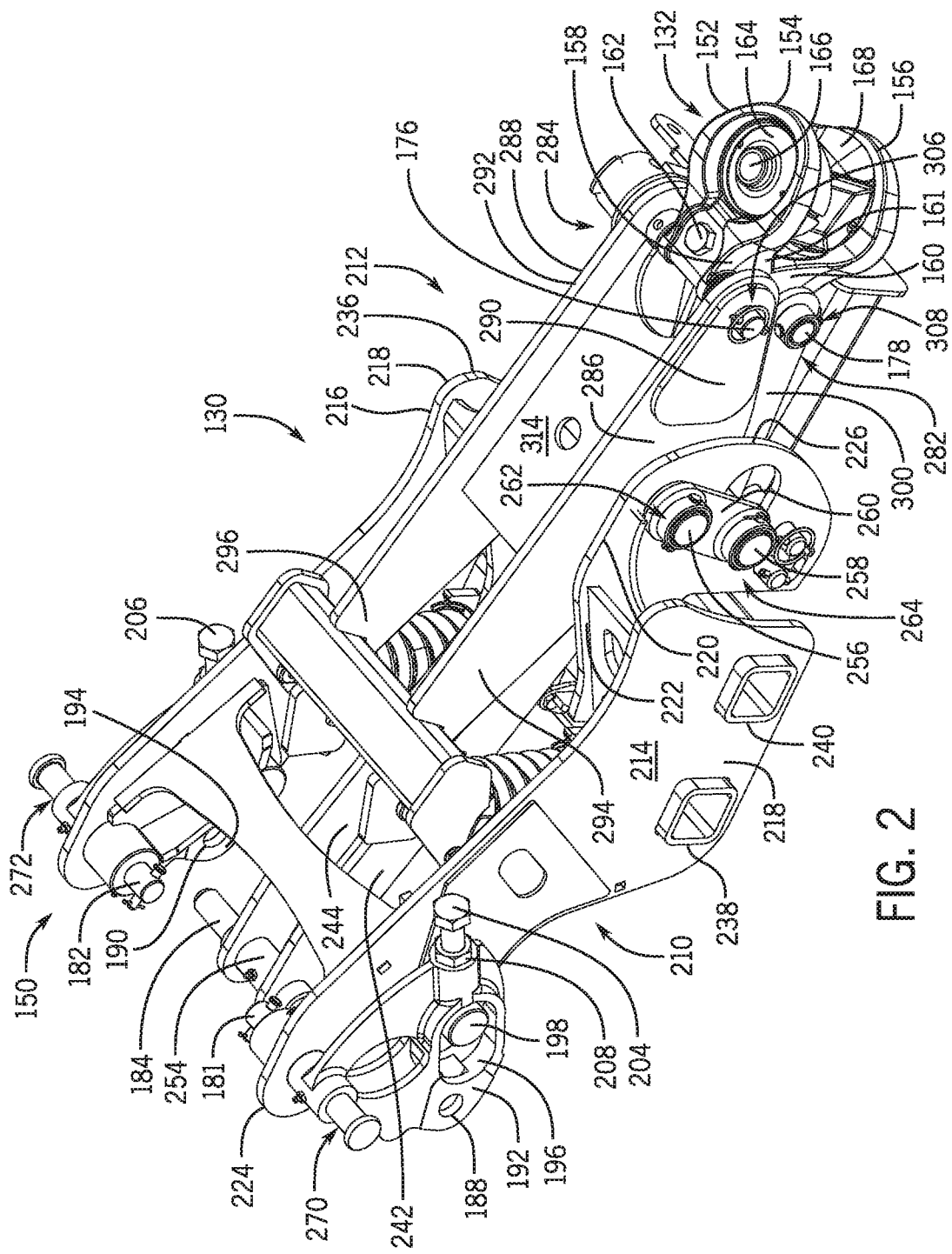
FIG. 2 is a front isometric view of the tongue assembly of FIG. 1 in accordance with an example embodiment.
Figure 3:
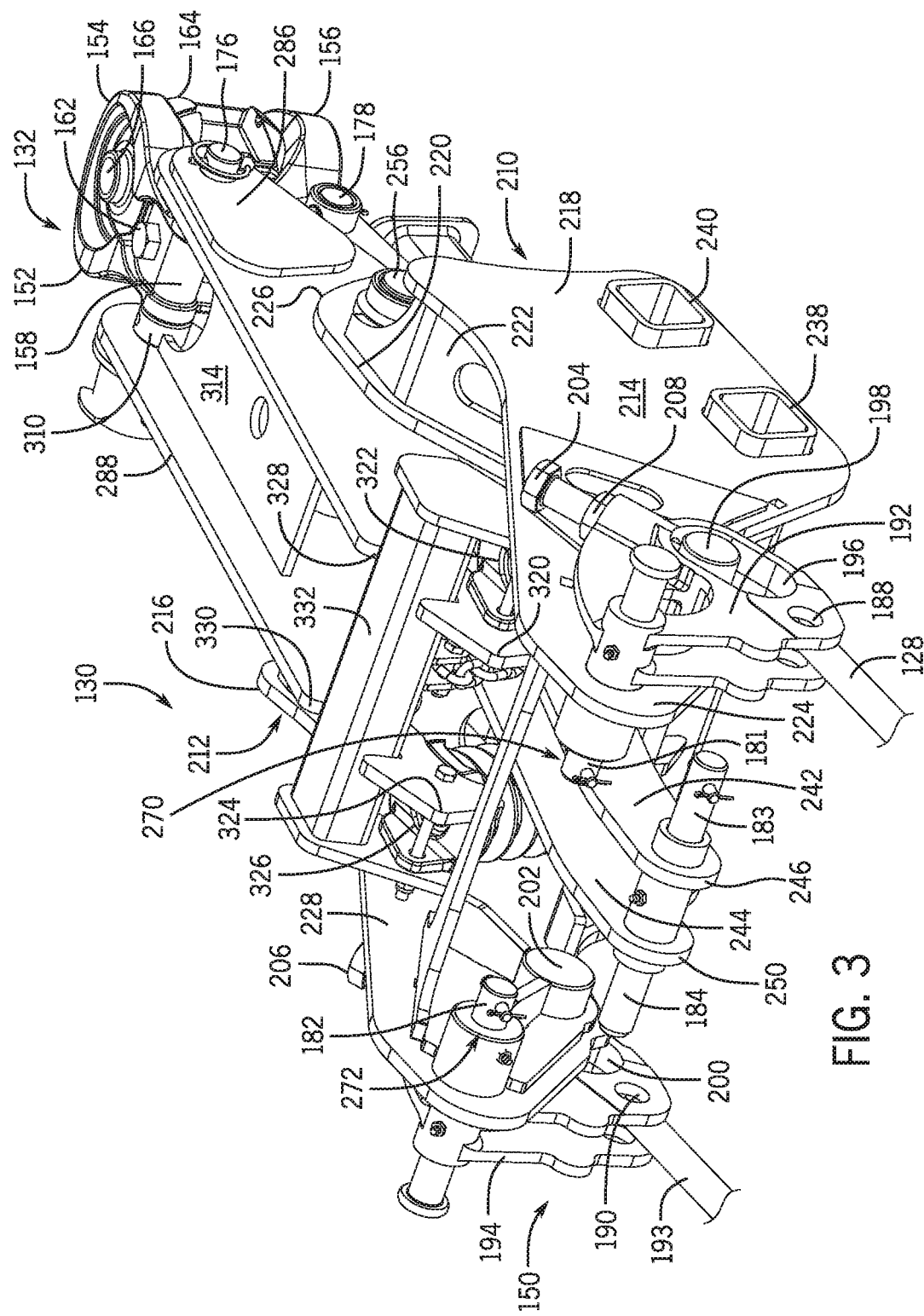
FIG. 3 is a rear isometric view of the tongue assembly.

Referring to FIG. 1, in some embodiments, the disclosed work vehicle train 100 may include a work vehicle 110, an implement in the current example a rotary cutter 120, and a tongue assembly 130. As shown, the tongue assembly 130 functions to couple the rotary cutter 120 to the work vehicle 110 such that the work vehicle 110 may tow the rotary cutter 120 for transport or to perform a designated task. Coupling is effected through a coupler 132 of the tongue assembly 130 that is connected/hitched to the drawbar 112 of the work vehicle 110, such as through a draw pin 134. Generally, the work vehicle 110 provides the propulsion force to pull the rotary cutter 120 as the rotary cutter 120 performs the task, although in other configurations the work vehicle 110 may push the rotary cutter 120. In the depicted example, the work vehicle 110 is a tractor and the rotary cutter 120 is a rotary cutter and will be referred to below as such. However, the tongue assembly 130 may be used with any combination of work vehicle 110 and rotary cutter 120, as referenced above.

As represented in FIG. 1, the work vehicle 110 and rotary cutter 120 travel over ground 140 that may be uneven including bumps and slopes (e.g., inclines, declines and side slopes). Such terrain may result in the work vehicle 110 and/or rotary cutter 120 undergoing vertical movement or even oscillation. Unless otherwise addressed, relative vertical movement between the work vehicle 110 and the rotary 120 cutter may become undesirable with forces resulting from the movement passing through the vehicle train. This may impact the effectiveness of the rotary cutter 120 in performing the designated task and/or may be perceived by the operator. Therefore according to the examples herein, the tongue assembly 130 functions to prevent and/or mitigate vertical forces from being transferred from the work vehicle 110 to the rotary cutter 120 and from the rotary cutter 120 to the work vehicle 110.

In this example, the rotary cutter 120 is equipped with a height adjustment system 122, that includes an actuator 124 to rotate the rear wheels 126, and simultaneously through a connecting rod or rods 128, to rotate the tongue assembly 130 relative to the rotary cutter 120. Rotation and of the rear wheels 126 on their carriages and of the tongue assembly 130, adjusts the height of the cutting deck 129 relative to the ground 140. For example, to leave a taller mat of plant material growing from the ground 140, the height of the cutting deck 129 will be raised. Raising the cutting deck 129 is effected by rotating the rear wheels 126 and the tongue assembly downward relative to the remainder of the rotary cutter 120. Lowering the cutting deck 129 is effected by rotating the rear wheels 126 and the tongue assembly upward relative to the remainder of the rotary cutter 120. Accordingly, rotating the tongue assembly 130 moves the coupler 132 up or down, which unless addresses as described below, would pivot the coupler 132 relative to the drawbar 112. Such pivoting, if allowed might create binds, forces, or limitations on height adjustment or result in connection challenges that are undesirable. The pivoting effect would be compounded when a suspended tongue approach is used. Accordingly, as disclosed herein, the tongue assembly 130 includes features to avoid pivoting of the coupler 132.

FIGS. 2-7 show various views of the tongue assembly 130 removed from the work vehicle train 100 of FIG. 1. As noted above, the tongue assembly 130 is coupled with both the work vehicle 110 and the rotary cutter 120 such that the work vehicle 110 may tow the rotary cutter 120. As such, the tongue assembly 130 is generally considered to include the coupler 132 at a forward position for hitching to the work vehicle 110 and a connection system 150 at a rear position for connection with the rotary cutter 120 at a mount 186 (shown in FIG. 1).

Figure 7:
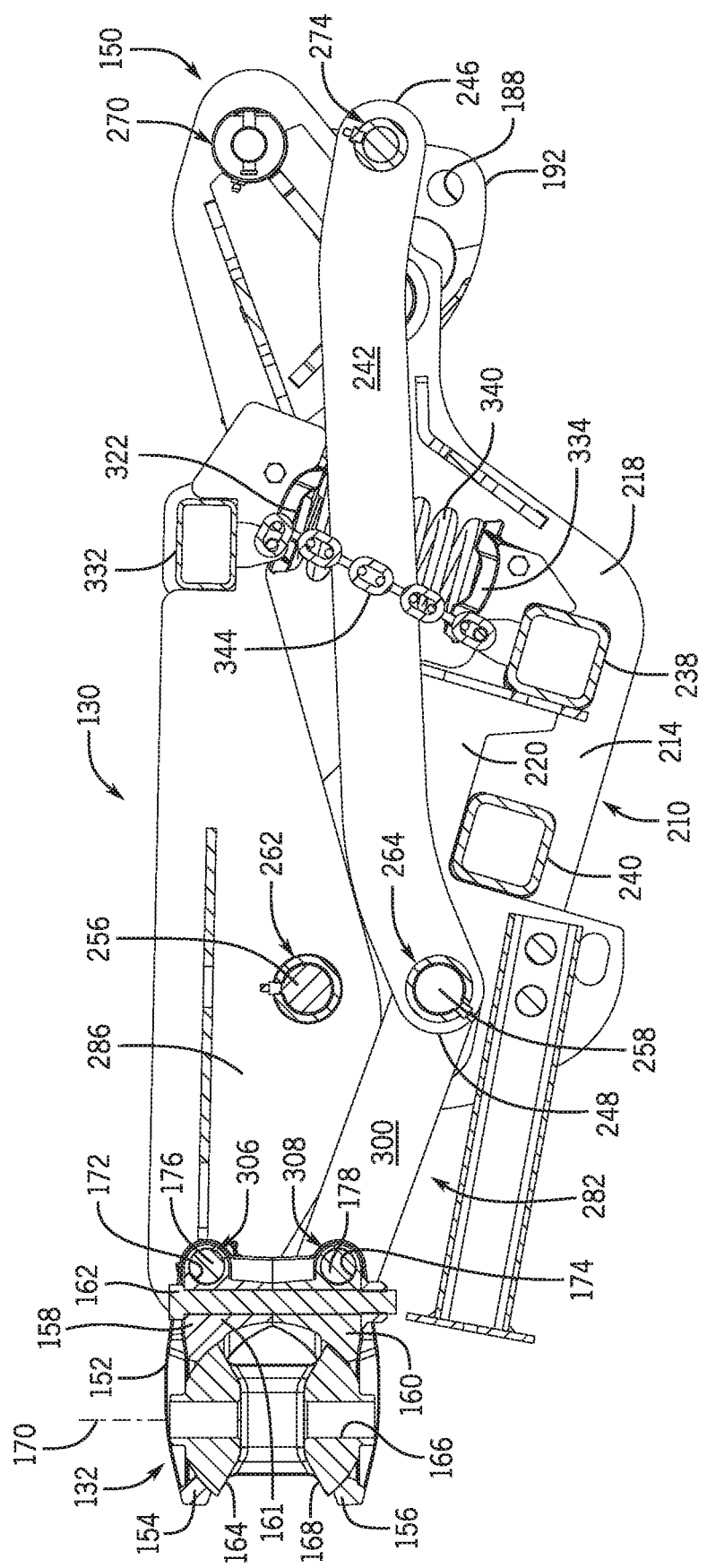
FIG. 7 is a cross-sectional view taken through line 7-7 of FIG. 4.

In this example, the coupler 132 includes a clevis 152 with an upper arm 154 spaced apart from a lower arm 156. Each of the upper and lower arms 154, 156 is formed in a ring shape and each includes a back section 158, 160 respectively, which are joined and clamped together by a bolt 162. The back sections 158, 160 form a bridge section 161 that maintains the upper and lower arms 154, 156 in fixed, separated positions facing each other. With the back sections 158, 160 bolted together forming the bridge section 161, the upper and lower arms 154, 156 contain a spherical receiver 164. The receiver 164 includes an opening 166 that is vertically oriented and that is configured to receive the draw pin 134. The receiver 164 also includes an opening 168 that is horizontally oriented and that is configured to receive the drawbar 112. Maintaining the opening 168 in its horizontal orientation is necessary for ease of coupling with the drawbar 112 and to avoid binds between the two. For example, the receiver 164 is configured to rotate about a vertical axis 170 (shown in FIG. 7), such as may occur when the work vehicle 110 navigates through a turn and the drawbar 112 becomes angled relative to the rotary cutter 120. As shown in FIG. 7, the clevis 152 also includes an upper opening 172 in the back section 158 and a lower opening 174 in the back section 160, which provide connecting points that receive upper and lower pins 176, 178 for connecting the coupler 132 in the tongue assembly 130 as further described below.

Figure 8:
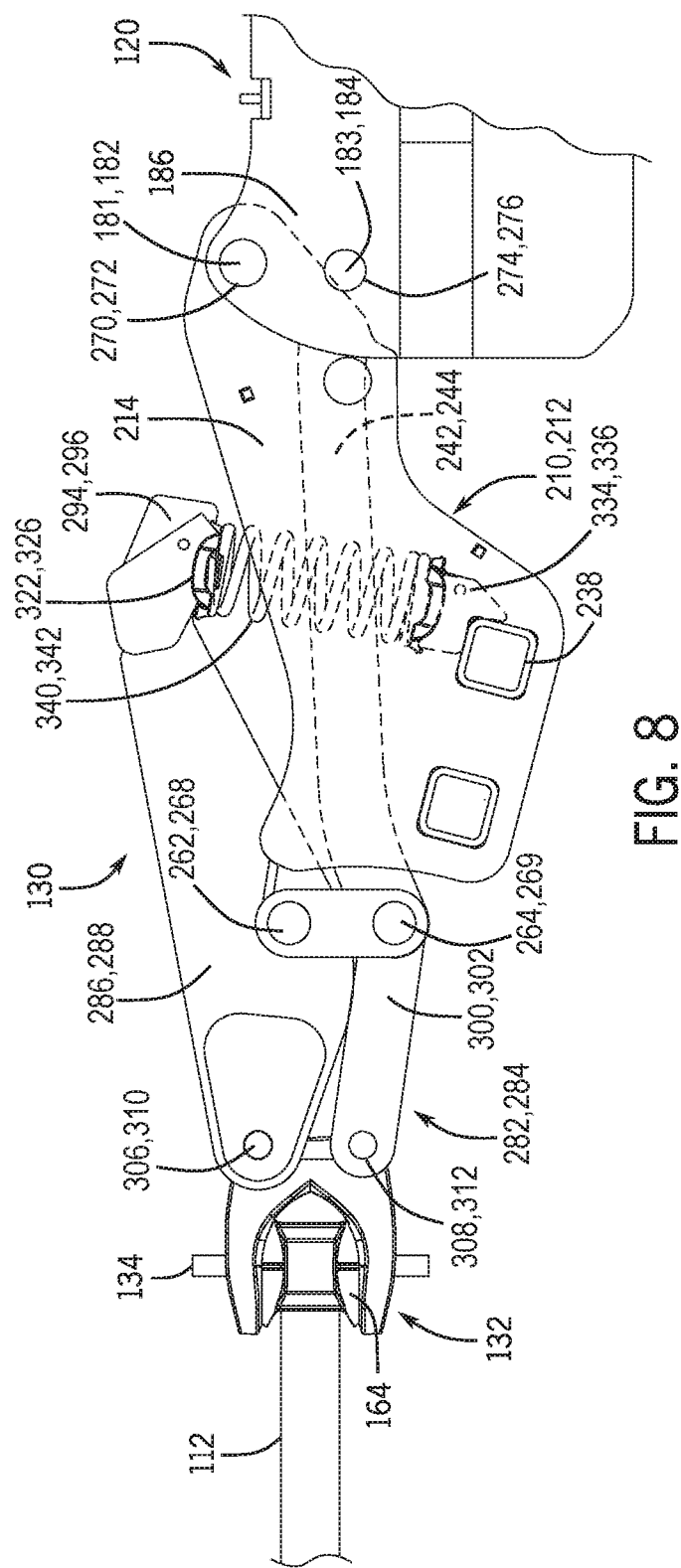
FIG. 8 is a schematic view of the tongue assembly in a first, base position.

At the proximal end of the tongue assembly 130, the connection system 150 includes pins 181-184 for connecting with the rotary cutter 120 via connections with a mount 186 (shown in FIGS. 1 and 8). The pins 181-184 are disposed horizontally and in this example are removeably connectable with the rotary cutter 120. The connection system 150 also includes openings 188, 190 for connecting with the connecting rod 128 and a second connecting rod 193. The openings 188, 190 are provided in a pair of height adjuster brackets 192, 194, respectively. The bracket 192 is pivotally connected in the tongue assembly 130 by the pin 181 and includes a slot 196 into which a leveling rod 198 extends. The bracket 194 is pivotably connected in the tongue assembly 130 by the pin 182 and includes a slot 200 into which a leveling rod 202 extends. The brackets 192, 194 are rotated in concert with one another when the connecting rods 128, 193 are driven by the actuator 124. Rotating the brackets 192, 194 raises or lowers the remainder of the tongue assembly 130 which rotates about the pins 181, 182. Level is fine-tuned through the use of leveling screws 204, 206, which include jam nuts 208, 209 for fixing their threaded location. The leveling screws 204, 206 act against the leveling rods 198, 202, respectively, and are used to level the rotary cutter 120 front-to-back and side-to-side.

The tongue assembly 130 includes connected, dual primary linkage mechanisms 210, 212 each arranged as a four-bar mechanism and includes upper links 214, 216. The upper link 214 includes an outer plate 218 connected with an inner plate 220 by at least one spanning plate 222 in a weldment. As such, the upper link 214 is a rigid link that extends between an end 224 at the rotary cutter 120 and an end 226. The upper link 216 includes an outer plate 228 connected with an inner plate 230 by at least one spanning plate 232 in another rigid weldment. The upper link 216 extends between an end 234 at the rotary cutter 120 and an end 236. The outer plates 218 and 228 are connected together by structural elements 238 and 240, which in this example are square tubes that join the upper links 214, 216 together.

The primary linkage mechanism 210 includes a lower link 242, and the primary linkage mechanism 212 includes a lower link 244. The lower link 242 extends from an end 246 that receives the pin 183 to an end 248. Similarly, the lower link 244 extends from an end 250 that receives the pin 184 to an end 252. The lower links 242, 244 are connected together by a tube 254 disposed near the ends 246, 250. The lower links 242, 244 are formed similar to one another as elongated plates or bars, each with a slight bend.

The upper link 214 includes an opening near its end 226 that receives a pin 256. The pin 256 extends across the tongue assembly 130 and is received in an opening near the end 236 of the upper link 216. Similarly, the lower link 242 includes an opening near its end 248 that receives a pin 258. The pin 258 extends across the tongue assembly 130 and is received in an opening near the end 252 of the lower link 244. A spacing link 260 extends between the upper link 214 and the lower link 242 and is connected with each by the pins 256, 258, respectively. The pinned connection between the upper link 214 and the spacing link 260 forms an upper pivot 262. The pinned connection between the lower link 242 and the spacing link 260 forms a lower pivot 264. Similarly, a spacing link 266 extends between the upper link 216 and the lower link 244 and is connected with each by the pins 256, 258, respectively. The pinned connection between the upper link 216 and the spacing link 266 forms an upper pivot 268. The pinned connection between the lower link 244 and the spacing link 266 forms a lower pivot 269.

Figure 4:
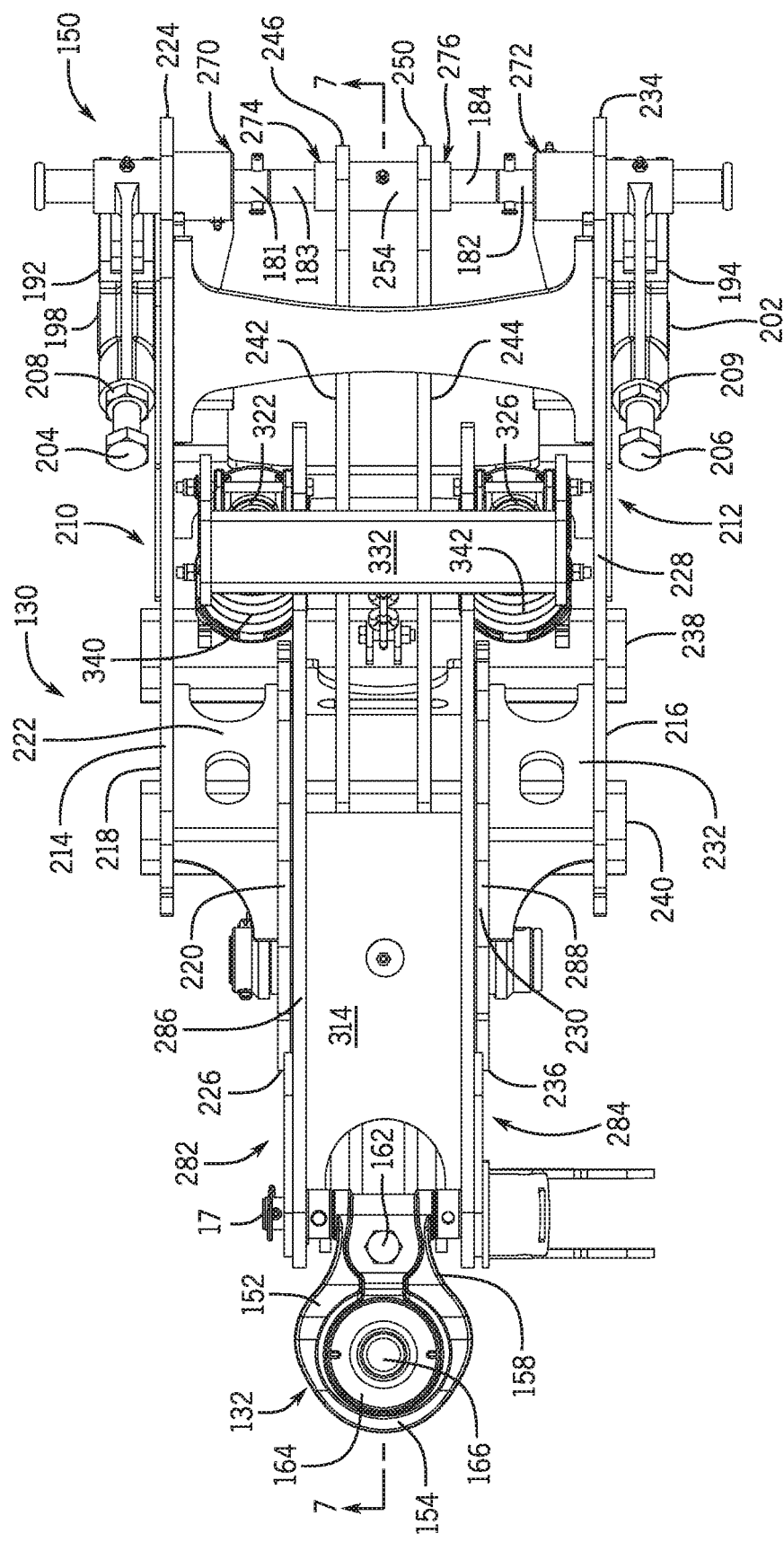
FIG. 4 is a top view of the tongue assembly.
Figure 5:
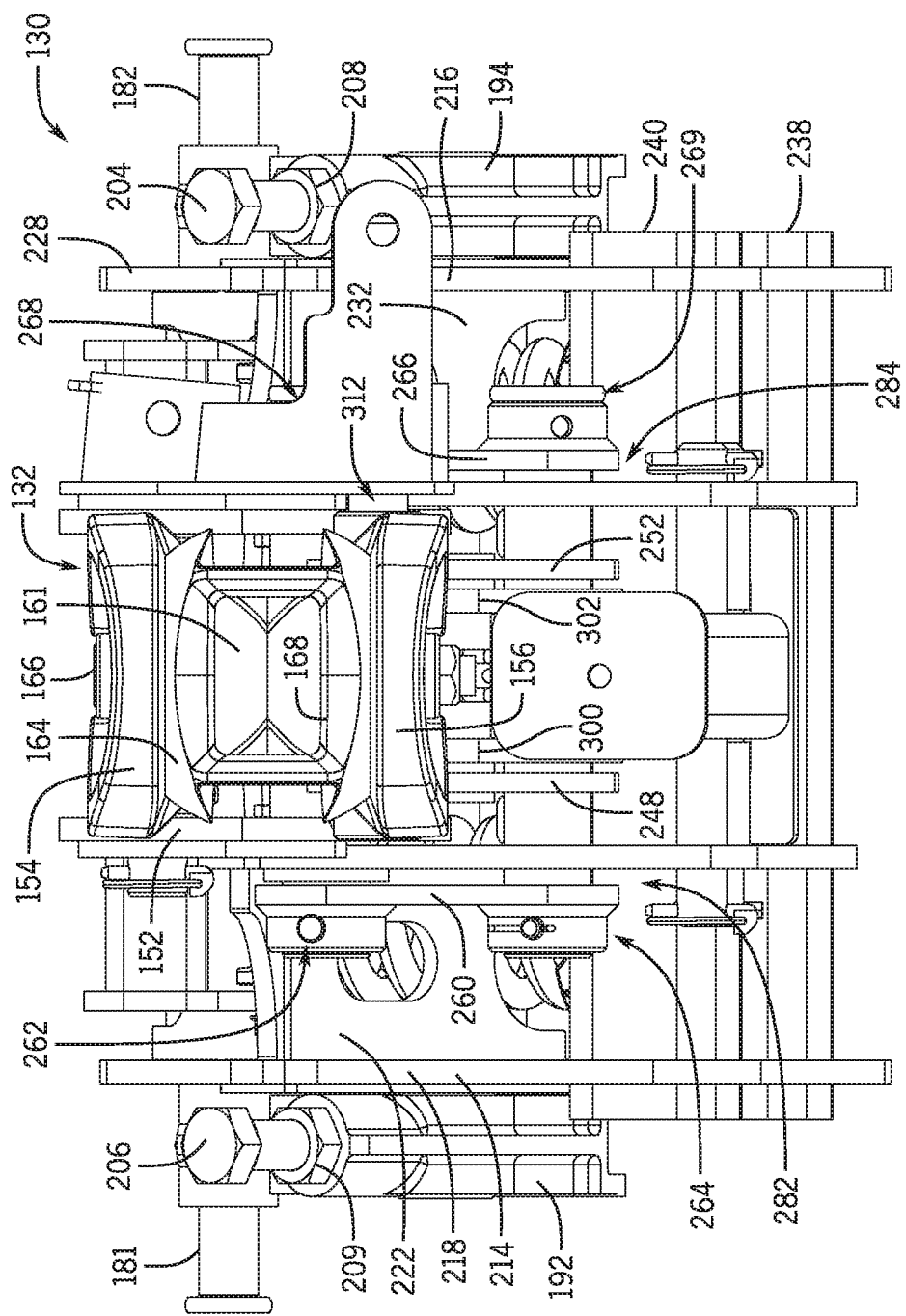
FIG. 5 is a front view of the tongue assembly.
Figure 6:
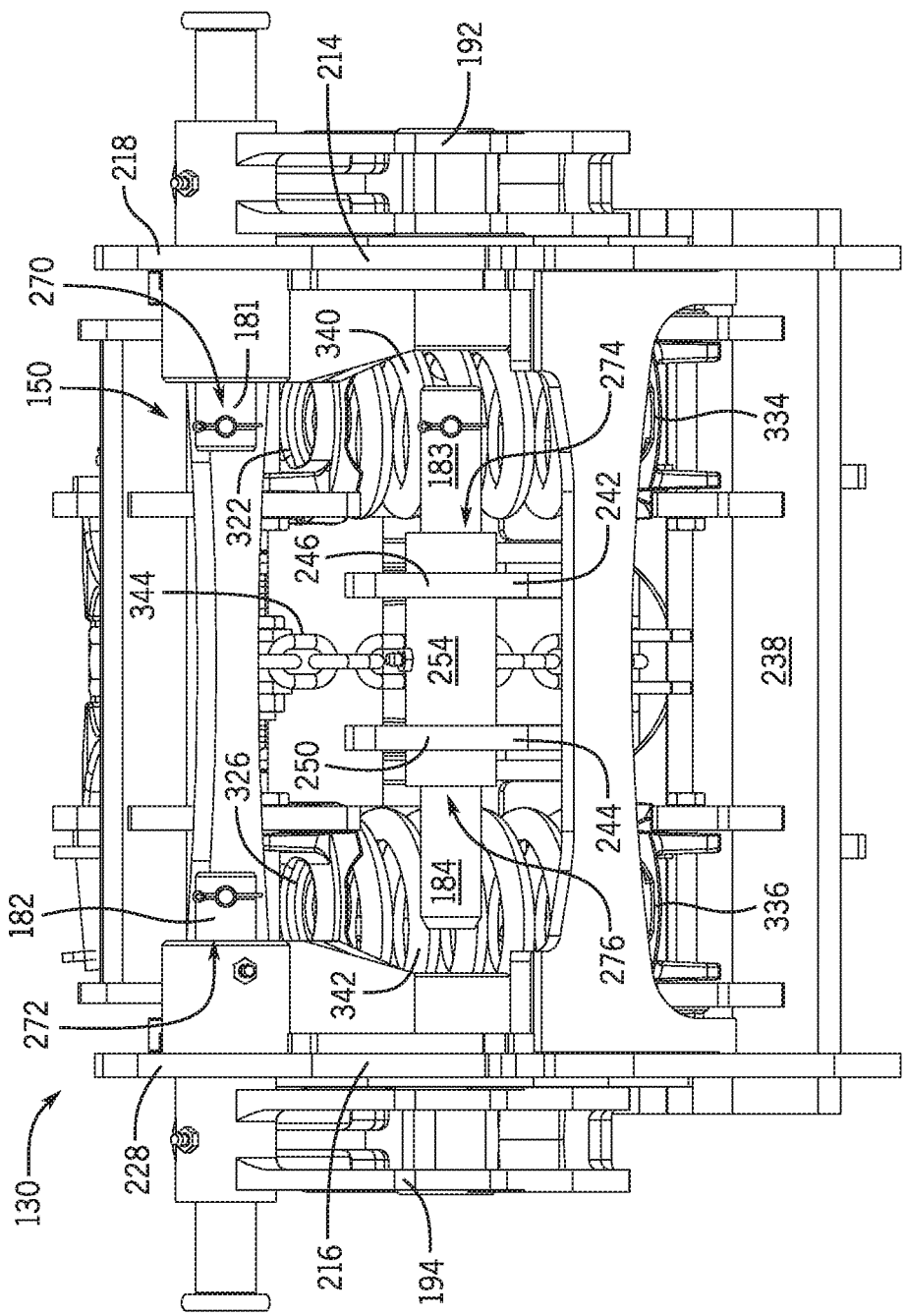
FIG. 6 is a rear view of the tongue assembly.

When the upper link 214 is connected with the rotary cutter 120 at the mount 186 by the pin 181 as shown in FIG. 8, the pinned connection forms an upper pivot 270. Similarly, the upper link 216, when connected with the rotary cutter 120 at the mount 186 by the pin 182 as shown in FIG. 4, the pinned connection forms an upper pivot 272. When the lower link 242 is connected with the rotary cutter 120 at the mount 186 by the pin 183 as shown in FIG. 8, the pinned connection forms an lower pivot 274. Similarly, the lower link 244, when connected with the rotary cutter 120 at the mount 186 by the pin 184 as shown in FIG. 4, the pinned connection forms an lower pivot 276. Accordingly, the mount 186 forms a vertical link in the four-bar linkage mechanisms of the primary linkage mechanisms 210, 212.

The primary linkage mechanism 210 includes the upper link 214, the mount 186, the lower link 242, the spacing link 260 and the pivots 262, 264, 270 and 274, forming the four-bar linkage mechanism. The primary linkage mechanism 212 includes the upper link 216, the mount 186, the lower link 244, the spacing link 266 and the pivots 268, 269, 272 and 276, forming the four-bar linkage mechanism. The primary linkage mechanisms 210, 212 rotates about upper pivots 270, 272 on the pins 181 and 182. The primary linkage mechanisms 210, 212 rotate together, including when the height of the rotary cutter 120 is adjusted using the connecting rods 128, 193 to rotate the brackets 192, 194. The primary linkage mechanisms 210, 212 may rotate individually, which may slightly tip the entire rigid assembly, when the leveling screws 204, 206 are used, one at a time, to tune the level the rotary cutter 120.

The tongue assembly 130 includes connoted, dual secondary linkage mechanisms 282, 284, each arranged as a four-bar mechanism and includes upper links 286, 288. The upper links 286, 288 include respective bodies 290, 292 and extending arms 294, 296. The body 290 extends between the upper pivot 262 and the coupler 132, and the body 292 extends between the upper pivot 268 and the coupler 132. The arms 294, 296 extend over the upper links 214, 216 respectively, toward their ends 224, 234 as further described below. The secondary linkage mechanisms 282, 284 include lower links 300, 302, respectively. The lower link 300 extends between the lower pivot 264 and the coupler 132, and the lower link 302 extends between the lower pivot 269 and the coupler 132. The clevis 152 of the coupler 132 includes the connecting points at the upper and lower pins 176, 178 for connecting the coupler 132 in the tongue assembly 130. The connection between the upper link 286 and the coupler 132 as effected by the pin 176, forms an upper pivot 306. The connection between the lower link 300 and the coupler 132 as effected by the pin 178, forms a lower pivot 308. The connection between the upper link 288 and the coupler 132 as effected by the pin 176 forms an upper pivot 310. The connection between the lower link 302 and the coupler 132 as effected by the pin 178 forms a lower pivot 312.

The secondary linkage mechanism 282 includes the upper link 286, the spacing link 260, the lower link 300, the coupler 132, and the pivots 262, 264, 306 and 308, forming a four-bar linkage mechanism. The secondary linkage mechanism 284 includes the upper link 288, the spacing link 266, the lower link 302, the coupler 132 and the pivots 268, 269, 310 and 312, forming a four-bar linkage mechanism. The secondary linkage mechanisms 282, 284 are connected by a plate 314 that spans between the two forming a weldment. The secondary linkage mechanisms 282, 284 moveably suspend the coupler 132 relative to the rotary cutter 120 as further described below. The primary linkage mechanisms 210, 212 and the secondary linkage mechanisms 282, 284 form a linkage mechanism that extends from a proximal end at the rotary cutter 120 to a distal end at the coupler 132.

As noted above, the arms 294, 296 of the upper links 286, 288 respectively, extend over the upper links 214, 216 respectively, toward their ends 224, 234. The arm 294 has an end 320 (visible in FIG. 3), that carries an upper suspension mount 322 and the arm 296 has an end 324 that carries an upper suspension mount 326. The arm 294 has an aperture 328 and the arm 296 has an aperture 330. The apertures 328, 330 are formed as square cutouts that receive a tubular structural element 332 that connects the arms 294, 296 together. A pair of lower suspension mounts 334, 336 are connected with the structural element 238 (visible in FIG. 6). A suspension element 340 extends between the suspension mounts 322, 334 and a suspension element 342 extends between the suspension mounts 326, 336. In one example, each suspension element 340, 342 is a coil spring or a combination of springs (e.g., nested springs). In other examples, the suspension elements 340, 342 may include a piston and cylinder arrangement, gas springs, shock absorbers, air bags, torsional springs, or any other mechanism suitable to absorb energy. The suspension elements 340, 342 compress and expand operating to absorb energy, and allow the coupler 132 to move up and down relative to the rotary cutter 120. A linking element 344 is connected to the tubular element 332 and to the structural element 238 to limit extension of the suspension elements 340, 342. In the current example, the linking element 344 is a chain made of individual links connected together. In other examples, the linking element 344 may take other forms such as a cable, an individual plate with a pin and slot, linked together plates, mechanical stops or other forms.

During operation, the work vehicle 110 and/or rotary cutter 120 may be subject to relative vertical movement, such as when traversing uneven terrain. For example, when the work vehicle 110 drives over a bump, it may be forced upwards relative to the tongue assembly 130 and the rotary cutter 120. In another example, when the work vehicle 110 traverses a dip or pothole, it may be forced downwards relative to the tongue assembly 130 and the rotary cutter 120. These actions may be repeated for the rotary cutter 120 relative to the tongue assembly 130 and work vehicle 110 when the rotary cutter 120 subsequently drives over the bump, dip, or pothole. The tongue assembly 130 functions to absorb the energy of the relative movement to prevent or mitigate the resulting forces from traveling between the work vehicle 110 and rotary cutter 120.

Figure 9:
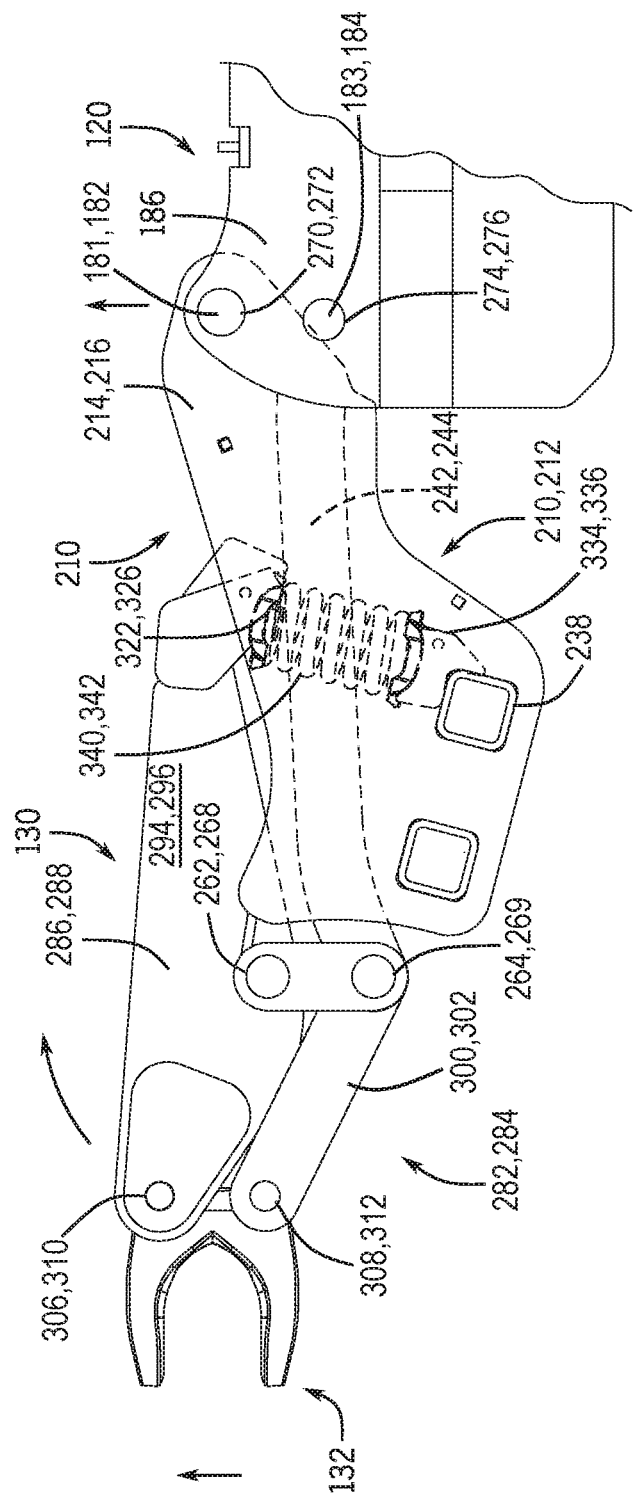
FIG. 9 is a schematic view of the tongue assembly in a second position with the suspension elements compressed.
Figure 10:
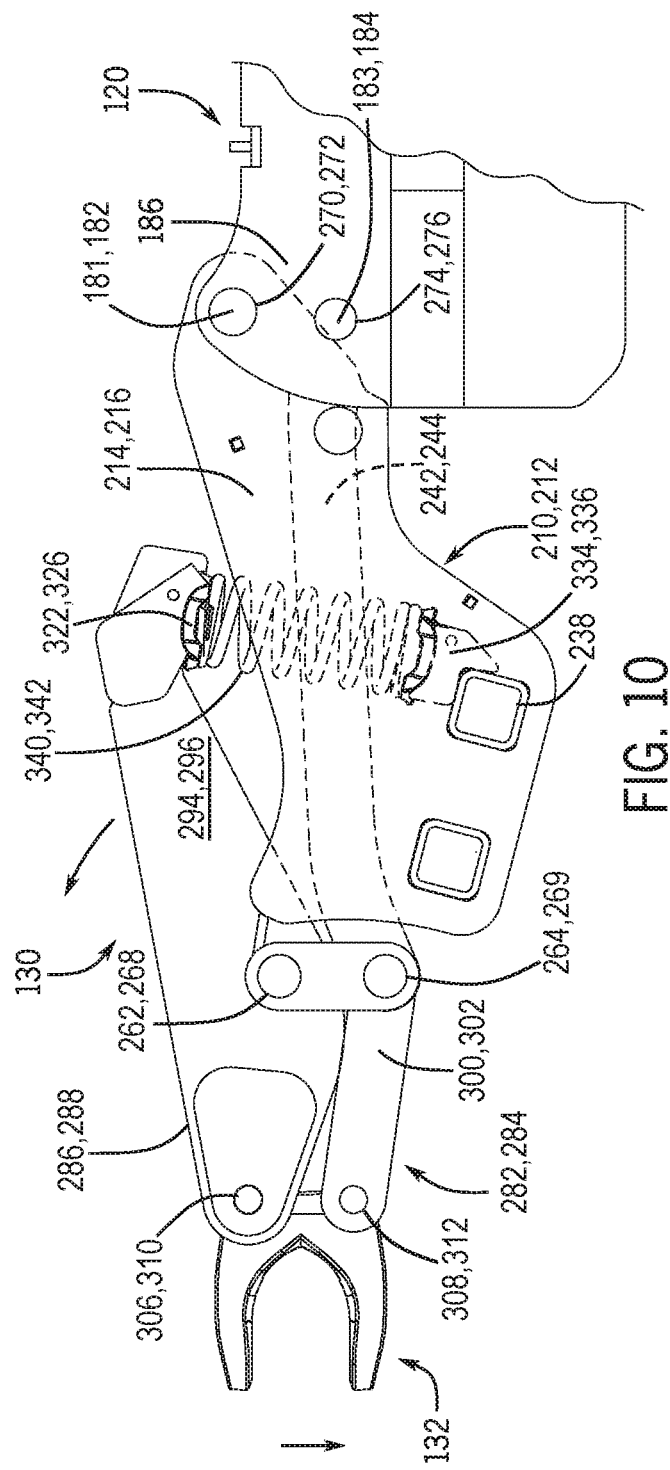
FIG. 10 is a schematic view of the tongue assembly in a third position with the suspension elements extended.

Examples of operation of the tongue assembly 130 during relative vertical movement between the work vehicle 110 and the rotary cutter 120 is provided by a comparison of FIGS. 8-10. FIG. 8 depicts a schematic view of the tongue assembly 130 in a normal position, FIG. 9 depicts a schematic view of the tongue assembly 130 when the coupler 132 is forced upward by the drawbar 112 and/or the mount 186 is forced downward by the rotary cutter 120, and FIG. 10 depicts a schematic view of the tongue assembly 130 when the coupler 132 is forced downward by the drawbar 112 and/or the mount 186 is forced upward by the rotary cutter 120.

In the example of the drawbar 112 forcing the coupler 132 upward as per FIG. 9, the lower pivots 264, 269 are held in place vertically relative to the rotary cutter 120 by the primary linkage mechanisms 210, 212, with the pivots 270, 272 and 274, 276 fixed at the mount 186. The arms 294, 296 through the suspension mounts 322, 326, compress the suspension elements 340, 342 and the upper links 286, 288 rotate as a result, allowing the coupler 132 to move upward relative to the rotary cutter 120, absorbing the input and reducing its transmission to the rotary cutter 120. In an example where the drawbar 112 forces the coupler 132 downward as per FIG. 10, the arms 294, 296 allow the suspension elements 340, 342 to extend allowing the coupler 132 to move downward relative to the rotary cutter 120, absorbing the input and reducing its transmission to the rotary cutter 120. As the coupler 132 moves upward or downward, the upper links 286, 288 and the lower links 300, 302 guide the coupler 132 without rotating it from being aligned with the drawbar 112, maintaining the coupler 132 in a level condition relative to the rotary cutter 120 and relative to the ground 140 when it is level. Level means that the coupler 132 does not rotate relative to the rotary cutter 120 so the arms 294, 296 always terminate in their forwardmost points at the same vertical line, for example the line 346, where the vertical line 346 is normal to the generally horizontal cutting deck 129.

In the example of the rotary cutter 120 forcing the mount 186 upward as per FIG. 9, the lower pivots 264, 269 are held in place vertically relative to the rotary cutter 120 by the primary linkage mechanisms 210, 212, with the pivots 270, 272 and 274, 276 fixed at the mount 186. The structural element 238, through the suspension mounts 334, 336 compresses the suspension elements 340, 342 and the upper links 286, 288 rotate as a result, allowing the mount 186 to move upward relative to the coupler 132, absorbing the input and reducing its transmission to the work vehicle 110. In an example where the rotary cutter 120 forces the mount 186 downward as per FIG. 10, the suspension elements 340, 342 will extend allowing the mount 186 to move downward relative to the coupler 132, absorbing the input and reducing its transmission to the work vehicle 110. As the mount 186 moves upward or downward, the upper links 286, 288 and the lower links 300, 302 guide the coupler 132 without rotating it from being aligned with the drawbar 112, maintaining the coupler in a level condition relative to the rotary cutter 120 and relative to the ground 140 when it is level.

When the height of the rotary cutter 120 is adjusted and the primary linkage mechanisms 210, 212 are rotated about the pivots 270, 272 on the pins 181-184, the pivots 262, 268 and 264, 269 move upward for a lower cutting height and move downward for a higher cutting height. As the pivots 262, 268 and 264, 269 move, the secondary linkage mechanisms 282, 284 maintain the coupler 132 in a level condition relative to the rotary cutter 120 and relative to the ground 140 when it is level. Accordingly, whether the height of the coupler 132 changes in relation to the rotary cutter 120 as a result of operation over uneven ground or during height adjustment, the coupler 132 is maintained in a level condition, as shown in FIGS. 8-10.

Relative vertical movement of the work vehicle 110 and/or rotary cutter 120 is accommodated by pivoting the upper links 286, 288 in concert, absorbing the energy resulting from this movement. In other words, a portion of the kinetic energy of the movement is converted into heat in the suspension elements 340, 342, which is subsequently dissipated, and/or a portion the kinetic energy is returned by the suspension elements 340, 342 to the originating work vehicle 110 or rotary cutter 120 upon returning to the original position. The suspension elements 340, 342 additionally or alternatively function to absorb or dampen shock impulses that would otherwise result in vertical oscillations transferred back and forth between the work vehicle 110 and rotary cutter 120. In events where all of the energy is not absorbed, the tongue assembly 130 reduces the vertical amplitude that would otherwise result from such forces. Accordingly, the tongue assembly 130 reduces the impact of relative movement of the work vehicle 110 on the rotary cutter 120, and vice versa, particularly from uneven terrain such as bumps. This provides improved control and effectiveness for the rotary cutter 120 in performing a designated task, especially for a task that relies upon a consistent vertical position of the rotary cutter 120, such as a cutting operation. The tongue assembly 130 further provides decreased vertical forces on the rotary cutter 120 and/or work vehicle 110 as a result of preventing or mitigating relative force transfer, thereby improving durability. This enables enhanced stability and operator comfort. In addition, the tongue assembly 130 maintains the coupler 132 in a level condition, whether inputs are a result of uneven ground, height adjustment or otherwise. This means that binds or forces are not created between the coupler 132 and the drawbar 112.

Also, the following examples are provided, which are numbered for easier reference.

1. A shock-absorbing tongue assembly for coupling a rotary cutter with a work vehicle, the assembly comprising: a coupler configured to couple to the work vehicle; and a linkage mechanism having a proximal end at the rotary cutter and a distal end at the coupler, wherein the linkage mechanism further comprises: a suspension element configured to dampen energy transferred between the rotary cutter and the work vehicle; a primary linkage mechanism extending from the rotary cutter; and a secondary linkage mechanism extending between the primary linkage mechanism and the coupler; wherein the secondary linkage mechanism is configured to rotate about the primary linkage mechanism while maintaining the coupler in a level condition.

2. The assembly of example 1, further comprising upper and lower connections on the rotary cutter configured to connect the assembly with the rotary cutter; wherein the primary linkage mechanism includes a first four-bar linkage with a first upper link and a first lower link each extending from the proximal end in a direction away from the rotary cutter, the first upper link connected with the rotary cutter at the upper connection and the first lower link connected with the rotary cutter at the lower connection; wherein the secondary linkage mechanism includes a second four-bar linkage with a second upper link and a second lower link, the linkage mechanism further comprising: a first upper pivot connecting the first upper link with the second upper link; a first lower pivot connecting the first lower link with the second lower link; a second upper pivot connecting the second upper link with the coupler; and a second lower pivot connecting the second lower link with the coupler.

3. The assembly of example 2, wherein the second upper link comprises a body with an arm extending from the body and above the first upper link, and further comprising: a first suspension mount connected with the arm; and a second suspension mount connected with the first upper link; wherein the suspension element is disposed between the first and second suspension mounts.

4. The assembly of example 2, further comprising a spacing link connected with the first upper pivot and with the first lower pivot.

5. The assembly of example 2, wherein the first upper link comprises a first plate, a second plate spaced apart from the first plate, and a structural element connecting the first and second plates.

6. The assembly of example 2, wherein the second upper link comprises a body with an arm extending from the body and above the first upper link, and further comprising: a first suspension mount connected with the arm; and a second suspension mount connected with the first upper link at the structural element; wherein the suspension element is disposed between the first and second suspension mounts.

7. The assembly of example 6, further comprising a linking element connected between the arm and the structural element, the linking element configured to limit extension of the suspension element.

8. The assembly of example 6, wherein the arm extends from the body at the first upper pivot and toward the proximal end.

9. The assembly of example 6, wherein the coupler is configured to move up and down relative to the rotary cutter during compression and extension of the suspension element.

10. The assembly of example 1, further comprising: a second primary linkage mechanism connected with the rotary cutter; and a second secondary linkage mechanism connected between the second primary linkage mechanism and the coupler.

11. The assembly of example 1, further comprising a height adjuster configured to raise and lower the coupler to adjust the height of the rotary cutter, wherein the primary and secondary linkage mechanisms are configured to maintain the coupler in the level condition when raised or lowered.

12. A shock-absorbing tongue assembly for coupling a rotary cutter with a work vehicle, the assembly comprising: a coupler configured to couple to the work vehicle; and a linkage mechanism having a proximal end at the rotary cutter and a distal end at the coupler, wherein the linkage mechanism further comprises: a suspension element configured to dampen energy transferred between the rotary cutter and the work vehicle; a primary linkage mechanism extending from the rotary cutter and including a first upper link and a first lower link each extending from the proximal end in a direction away from the rotary cutter, the first upper link connected with the rotary cutter at an upper connection and the first lower link connected with the rotary cutter a lower connection, the upper and lower connections spaced apart on the rotary cutter; and a secondary linkage mechanism extending between the primary linkage mechanism and the coupler and including a second upper link connected with the first upper link, and a second lower link connected with the first lower link.

13. The assembly of example 12, further comprising a height adjuster configured to raise and lower the coupler relative to the rotary cutter to adjust the height of the rotary cutter, wherein the primary and secondary linkage mechanisms are configured to maintain the coupler in a level condition when the tongue is raised and lowered.

14. The assembly of example 12, further comprising: a first upper pivot connecting the first and second upper links; a first lower pivot connecting the first and second lower links; a second upper pivot connecting the second upper link with the coupler; a second lower pivot connecting the second lower link with the coupler, the second lower pivot spaced apart from the second lower pivot by being connected with the coupler; a first suspension mount connected with the arm; and a second suspension mount connected with the first upper link; wherein the suspension element is disposed between the first and second suspension mounts, the suspension element configured to compress and extend when the second upper link rotates about the first upper pivot.

15. The assembly of example 14, further comprising a spacing link connected between the first upper pivot and the first lower pivot, the spacing link configured to translate vertically when the second upper link rotates about the first upper pivot.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A shock-absorbing tongue assembly for coupling a rotary cutter with a work vehicle, the assembly comprising:
    a coupler disposed at a distal end, and configured to couple with a work vehicle;
    a connection system disposed at a proximal end, and configured to couple with a rotary cutter; and
    a linkage mechanism disposed between the proximal end and the distal end, the linkage mechanism comprising:
        a suspension element that dampens energy transferred between the connection system and the coupler;
        a primary linkage mechanism extending from the connection system, the primary linkage mechanism comprising:
            a first upper link and a first lower link respectively extending from the proximal end in a direction away from the connection system, a proximal end of the first upper link comprising a portion of the connection system configured to operably couple with an upper connection of the rotary cutter, and a proximal end of the first lower link comprising a portion of the connection system configured to operably couple with a lower connection of the rotary cutter, the first upper link and first lower link operably spaced apart when coupled with the rotary cutter; and
        a secondary linkage mechanism extending between the primary linkage mechanism and the coupler, the secondary linkage mechanism operably rotates about the primary linkage mechanism while maintaining the coupler in a level condition.

2. The assembly of claim 1,
    wherein the primary linkage mechanism comprises a first four-bar linkage comprising the first upper link and the first lower link;
    wherein the secondary linkage mechanism comprises a second four-bar linkage comprising a second upper link and a second lower link, the linkage mechanism further comprising:
        a first upper pivot connecting the first upper link with the second upper link;
        a first lower pivot connecting the first lower link with the second lower link;
        a second upper pivot connecting the second upper link with the coupler; and
        a second lower pivot connecting the second lower link with the coupler.

3. The assembly of claim 2, wherein the second upper link comprises a body with an arm extending from the body and above the first upper link, and further comprising:
    a first suspension mount connected with the arm; and
    a second suspension mount connected with the first upper link;
    wherein the suspension element is disposed between the first and second suspension mounts.

4. The assembly of claim 2, further comprising a spacing link connected with the first upper pivot and with the first lower pivot.

5. The assembly of claim 2, wherein the first upper link comprises a first plate, a second plate spaced apart from the first plate, and a structural element connecting the first and second plates.

6. The assembly of claim 2, wherein the second upper link comprises a body with an arm extending from the body and above the first upper link, and further comprising:
    a first suspension mount connected with the arm; and
    a second suspension mount connected with the first upper link at the structural element;
    wherein the suspension element is disposed between the first and second suspension mounts.

7. The assembly of claim 6, further comprising a linking element connected between the arm and the structural element, the linking element configured to limit extension of the suspension element.

8. The assembly of claim 6, wherein the arm extends from the body at the first upper pivot and toward the proximal end.

9. The assembly of claim 6, wherein the coupler is configured to move up and down relative to the connection system during compression and extension of the suspension element.

10. The assembly of claim 1, further comprising:
    a second primary linkage mechanism comprising a portion of the connection system configured to operably couple with the rotary cutter; and
    a second secondary linkage mechanism connected between the second primary linkage mechanism and the coupler.

11. The assembly of claim 1, further comprising a height adjuster configured to raise and lower the coupler to adjust the height of the connection system, wherein the primary and secondary linkage mechanisms are configured to maintain the coupler in the level condition when raised or lowered.

12. A shock-absorbing tongue assembly for coupling a rotary cutter with a work vehicle, the assembly comprising:
    a coupler configured to couple with a work vehicle; and
    a connection system configured to couple with a rotary cutter;

a linkage mechanism comprising a proximal end at the connection system and a distal end at the coupler, wherein the linkage mechanism further comprises:
  a suspension element that dampens energy transferred between the connection system and the coupler;
  a primary linkage mechanism comprising a first upper link and a first lower link each extending from the proximal end in a direction away from the connection system, a proximal end of the first upper link comprising a portion of the connection system configured to operably couple with an upper connection of the rotary cutter, and a proximal end of the first lower link comprising a portion of the connection system configured to operably couple with a lower connection of the rotary cutter, the first upper link and first lower link operably spaced apart when coupled with the rotary cutter; and
  a secondary linkage mechanism extending between the primary linkage mechanism and the coupler and comprising a second upper link connected with the first upper link, and a second lower link connected with the first lower link.

13. The assembly of claim 12, further comprising a height adjuster configured to raise and lower the coupler relative to the connection system to operably adjust the height of the coupled with the connection system, wherein the primary and secondary linkage mechanisms are configured to maintain the coupler in a level condition when the tongue is raised and lowered.

14. The assembly of claim 12, further comprising:
  a first upper pivot connecting the first and second upper links;
  a first lower pivot connecting the first and second lower links;
  a second upper pivot connecting the second upper link with the coupler;
  a second lower pivot connecting the second lower link with the coupler, the second lower pivot spaced apart from the second lower pivot by being connected with the coupler;
  a first suspension mount connected with the arm; and
  a second suspension mount connected with the first upper link;
  wherein the suspension element is disposed between the first and second suspension mounts, the suspension element configured to compress and extend when the second upper link rotates about the first upper pivot.

15. The assembly of claim 14, further comprising a spacing link connected between the first upper pivot and the first lower pivot, the spacing link configured to translate vertically when the second upper link rotates about the first upper pivot.

16. The assembly of claim 12, wherein the first upper link comprises a first plate, a second spaced apart from the first plate, and a pair of tubular structural elements connecting the first and second plates.

17. The assembly of claim 12, wherein the second upper link includes a body with an arm extending from the body and above the first upper link, and further comprising a linking element connected between the arm and the first upper link, the linking element configured to limit extension of the suspension element.

18. The assembly of claim 12, wherein the coupler is configured to move up and down relative to the connection system during compression and extension of the suspension element.

19. The assembly of claim 12, further comprising:
  a mount configured to operably engage with the rotary cutter, the mount comprising the upper and lower connections;
  a spacing link connected between the first upper pivot and the first lower pivot; and
  a clevis on the coupler;
  wherein the mount, the spacing link, and the clevis are configured as links that are vertically disposed in the primary and secondary linkage mechanisms.

20. A shock-absorbing tongue assembly for coupling a rotary cutter with a work vehicle, the assembly comprising:
  a coupler configured to couple with a work vehicle and configured as a first vertical link;
  a mount that is operably engaged with the rotary cutter, the mount comprising upper and lower connections; and
  a linkage mechanism having a proximal end connected with the mount at the upper and lower connections and having a distal end connected with the coupler, wherein the linkage mechanism further comprises:
    a suspension element configured to dampen energy transferred between the mount and the coupler;
    a primary linkage mechanism including a first upper link and a first lower link, the first upper link connected with the mount at the upper connection and the first lower link connected with the rotary cutter mount at the lower connection, the first upper link and the first lower link spaced apart by being connected with the mount, the mount configured as a second vertical link; and
    a secondary linkage mechanism connected with the primary linkage mechanism and with the coupler, the secondary linkage mechanism including a second upper link and a second lower link, the second upper link comprises;
      a first upper pivot connecting the first and second upper links;
      a first lower pivot connecting the first and second lower links; and
      a spacing link connected between the first upper pivot and the first lower pivot, the spacing link configured as a third vertical link;
  wherein the coupler is configured to move vertically relative to the mount by operation of the linkage mechanism.

* * * * *